United States Patent
Boday et al.

(10) Patent No.: US 9,505,858 B2
(45) Date of Patent: Nov. 29, 2016

(54) POLYLACTIC ACID (PLA) WITH LOW MOISTURE VAPOR TRANSMISSION RATES BY GRAFTING THROUGH OF HYDROPHOBIC POLYMERS DIRECTLY TO PLA BACKBONE

(71) Applicant: International Business Machines Corporation, Armonk, NY (US)

(72) Inventors: Dylan J. Boday, Tucson, AZ (US); Timothy C. Mauldin, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 14/519,548

(22) Filed: Oct. 21, 2014

(65) Prior Publication Data

US 2016/0108163 A1  Apr. 21, 2016

(51) Int. Cl.
| | |
|---|---|
| C08F 120/22 | (2006.01) |
| C08F 214/18 | (2006.01) |
| C08F 265/04 | (2006.01) |
| C08F 293/00 | (2006.01) |
| C08G 63/08 | (2006.01) |

(52) U.S. Cl.
CPC ........... C08F 120/22 (2013.01); C08F 214/18 (2013.01); C08F 265/04 (2013.01); C08F 293/005 (2013.01); C08G 63/08 (2013.01); C08F 2438/01 (2013.01)

(58) Field of Classification Search
None
See application file for complete search history.

(56) References Cited

U.S. PATENT DOCUMENTS

| | | | |
|---|---|---|---|
| 5,357,034 A * | 10/1994 | Fridman | B01J 19/1862 528/354 |
| 5,922,832 A | 7/1999 | Randall et al. | |
| 5,952,433 A | 9/1999 | Wang et al. | |
| 6,306,209 B1 | 10/2001 | Woodworth et al. | |
| 6,359,081 B1 * | 3/2002 | Shimada | C08F 8/00 525/101 |
| 6,495,631 B1 | 12/2002 | Randall et al. | |
| 6,730,772 B2 | 5/2004 | Shastri | |

(Continued)

FOREIGN PATENT DOCUMENTS

| | | |
|---|---|---|
| CN | 102229744 A | 11/2011 |
| CN | 102229744 B | 6/2013 |

(Continued)

OTHER PUBLICATIONS

Coulembier, Macromolecules, 2010, 43, 575-579.*

(Continued)

Primary Examiner — Robert C Boyle
(74) Attorney, Agent, or Firm — Matthew J. Bussan

(57) ABSTRACT

Polylactic acid-backbone graft and bottlebrush copolymers with low moisture vapor transmission rates are synthesized by polymerizing a lactide-functionalized hydrophobic macromonomer using ring-opening polymerization (ROP). In some embodiments of the present invention, the macromonomer is a lactide-functionalized hydrophobic polymer that may be synthesized by, for example, polymerizing a hydrophobic monomer (e.g., a fluorinated vinyl monomer such as 2,2,2-trifluroethyl methacrylate) capable of undergoing radical polymerization (e.g., styrenic, vinylic, acrylic, etc.) using a brominated lactide initiator via atom transfer radical polymerization (ATRP). The brominated lactide initiator may be 3-bromo-3,6-dimethyl-1,4-dioxane-2,5-dione prepared by, for example, reacting lactide with N-bromosuccinimide in the presence of benzoyl peroxide.

15 Claims, 4 Drawing Sheets

(56) References Cited

U.S. PATENT DOCUMENTS

| | | | |
|---|---|---|---|
| 7,049,373 | B2 | 5/2006 | Matyjaszewski et al. |
| 7,053,151 | B2 | 5/2006 | Wang et al. |
| 7,381,772 | B2 | 6/2008 | Flexman et al. |
| 7,491,438 | B2 | 2/2009 | Demott et al. |
| 7,531,585 | B2 | 5/2009 | Ozawa et al. |
| 7,807,745 | B2 | 10/2010 | Agarwal et al. |
| 7,863,382 | B2 | 1/2011 | Ishii et al. |
| 7,897,168 | B2 | 3/2011 | Chen et al. |
| 8,076,406 | B2 | 12/2011 | Brule et al. |
| 8,232,343 | B2 | 7/2012 | Chung et al. |
| 8,378,041 | B2 | 2/2013 | Johnson et al. |
| 8,445,593 | B2 | 5/2013 | Ishii et al. |
| 8,450,420 | B2 | 5/2013 | Sakurai |
| 8,470,371 | B2 | 6/2013 | Uchegbu et al. |
| 8,470,420 | B2 | 6/2013 | Hiruma et al. |
| 8,490,259 | B2 | 7/2013 | Hartgrove et al. |
| 8,519,018 | B2 | 8/2013 | Patel |
| 9,187,597 | B1 | 11/2015 | Boday et al. |
| 9,193,818 | B1 | 11/2015 | Boday et al. |
| 9,228,044 | B2 | 1/2016 | Boday et al. |
| 9,228,050 | B2 | 1/2016 | Boday et al. |
| 2001/0027237 | A1 | 10/2001 | Mayes et al. |
| 2003/0232088 | A1 | 12/2003 | Huang et al. |
| 2004/0208844 | A1 | 10/2004 | Ignatious |
| 2007/0196644 | A1 | 8/2007 | Wu et al. |
| 2008/0247987 | A1 | 10/2008 | Liggins et al. |
| 2009/0123412 | A1 | 5/2009 | Healy et al. |
| 2009/0186992 | A1* | 7/2009 | Higuchi ............... C08K 5/0083 525/450 |
| 2009/0208695 | A1 | 8/2009 | Funatsu et al. |
| 2009/0306333 | A1 | 12/2009 | Jing et al. |
| 2010/0112357 | A1 | 5/2010 | Fine et al. |
| 2011/0200784 | A1 | 8/2011 | Agarwal et al. |
| 2011/0245420 | A1 | 10/2011 | Rasal et al. |
| 2011/0313110 | A1 | 12/2011 | Inagaki |
| 2013/0030128 | A1 | 1/2013 | He et al. |
| 2013/0131275 | A1 | 5/2013 | Tillman et al. |
| 2013/0184429 | A1 | 7/2013 | Pugh et al. |
| 2015/0284485 | A1 | 10/2015 | Boday et al. |
| 2015/0284497 | A1 | 10/2015 | Boday et al. |
| 2015/0284506 | A1 | 10/2015 | Boday et al. |
| 2015/0361197 | A1 | 12/2015 | Boday et al. |
| 2016/0108163 | A1 | 4/2016 | Boday et al. |

FOREIGN PATENT DOCUMENTS

| | | | |
|---|---|---|---|
| EP | 2634179 | A1 | 9/2013 |
| JP | 09316310 | A | 12/1997 |
| JP | 2004051835 | A | 2/2004 |
| JP | 2004285258 | A | 10/2004 |
| JP | 2006212897 | A | 8/2006 |
| JP | 2009079196 | A | 4/2009 |
| JP | 2011032301 | A | 2/2011 |
| WO | WO2009099225 | A1 | 8/2009 |

OTHER PUBLICATIONS

Rzayev, Javid, "Synthesis of Polystyrene-Polylactide Bottlebrush Block Copolymers and Their Melt Self-Assembly into Large Domain Nanostructures", Macromolecules, vol. 42, No. 6, 2009, pp. 2135-2141.

Shinoda et al., "Structural Control of Poly(Methyl Methacrylate)-g-poly(Lactic Acid) Graft Copolymers by Atom Transfer Radical Polymerization (ATRP)", Macromolecules, vol. 34, No. 18, 2001, pp. 6243-6248.

Xia et al., "Efficient Synthesis of Narrowly Dispersed Brush Copolymers and Study of Their Assemblies: JThe Importance of Side Chain Arrangement", Journal of the American Chemical Society, vol. 131, No. 51, 2009, pp. 18525-18532.

Zhao et al., "Polystyrene-Polylactide Bottlebrush Block Copolymer at the Air/Water Interface", Macromolecules, vol. 42, No. 22, 2009, pp. 9027-9033.

Coulembier et al., Supporting Information for "From Jellyfish Macromolecular Architectures to Nanodoughnut Self-Assembly", vol. 43, No. 1, 2010, pp. 575-579, (5 pages of Supporting Information).

English Language Translation of JP10-001580 (1998), 20 pages.

List of IBM Patents or Patent Applications Treated as Related (Updated Oct. 19, 2015).

U.S. Appl. No. 14/833,080, to Boday et al., entitled "Initiation of Controlled Radical Polymerization From Lactide Monomer", filed Aug. 22, 2015, assigned to International Business Machines Corporation.

U.S. Appl. No. 14/243,034, to Boday et al., entitled "Initiation of Controlled Radical Polymerization From Lactide Monomer", filed Apr. 2, 2014, assigned to International Business Machines Corporation.

U.S. Appl. No. 14/243,191, to Boday et al., entitled "Versatile, Facile and Scalable Route to Polylactic Acid-Backbone Graft and Bottlebrush Copolymers", filed Apr. 2, 2014, assigned to International Business Machines Corporation.

U.S. Appl. No. 14/525,130, to Boday et al., entitled "Versatile, Facile and Scalable Route to Polylactic Acid-Backbone Graft and Bottlebrush Copolymers", filed Oct. 27, 2014, assigned to International Business Machines Corporation.

U.S. Appl. No. 14/519,549, to Boday et al., entitled "Flame-Retardant Polylactic Acid (PLA) by Grafting Through of Phosphorus-Containing Polymers Directly to PLA Backbone", filed Oct. 21, 2014, assigned to International Business Machines Corporation.

U.S. Appl. No. 14/526,943, to Boday et al., entitled "Toughened Polylactic Acid (PLA) by Grafting Through of Impact-Modifying Polymers Directly to PLA Backbone", filed Oct. 29, 2014, assigned to International Business Machines Corporation.

Hang, Leibniz Fangtinq, "Development of a polylactic acid (PLA) polymer with an acid-sensitive N-ethoxybenzylimidazole (NEBI) crosslinker as a drug delivery system", UC San Diego Electronic Theses and Dissertations, 2012, 127 pages.

Coulembier et al., "From Jellyfish Macromolecular Architectures to Nanodoughnut Self-Assembly", Macromolecules, vol. 43, No. 1, 2010, pp. 575-579.

Yuan et al., "Inherent flame retardation of bio-based poly(lactic acid) by incorporating phosphorus linked pendent group into the backbone", Polymer Degradation and Stability, vol. 96, 2011, pp. 1669-1675.

Li et al., "DMA Analysis on Bamboo Fiber/Polylactic Acid Composites", Mechanic Automation and Control Engineering (MACE), 2010 International Conference on Mechanic Automation and Control Engineering, 2010, pp. 3090-3092.

Yang et al., "Hybrid copolymerization of cyclic and vinyl monomers," Sci. China Chemistry, 2013, vol. 56, No. 8, pp. 1101-1104.

List of IBM Patents or Patent Applications Treated as Related (Updated Jun. 21, 2016).

* cited by examiner

FIG. 1

Polylactic Acid-Backbone Bottlebrush Copolymer with Low Moisture Vapor Transmission Rate --- Styrenic, vinylic, acrylic, etc. HY-polymer
— Polylactic acid (PLA)

POLYLACTIC ACID (PLA) WITH LOW MOISTURE VAPOR TRANSMISSION RATES BY GRAFTING THROUGH OF HYDROPHOBIC POLYMERS DIRECTLY TO PLA BACKBONE

BACKGROUND

The present invention relates in general to the field of biobased materials. More particularly, the present invention relates to polylactic acid-backbone graft and bottlebrush copolymers with low moisture vapor transmission rates prepared from lactide-functionalized hydrophobic macromonomers using ring-opening polymerization (ROP).

SUMMARY

In accordance with some embodiments of the present invention, polylactic acid-backbone graft and bottlebrush copolymers with low moisture vapor transmission rates are synthesized by polymerizing a lactide-functionalized hydrophobic macromonomer using ring-opening polymerization (ROP). In some embodiments of the present invention, the macromonomer is a lactide-functionalized hydrophobic polymer that may be synthesized by, for example, polymerizing a hydrophobic monomer (e.g., a fluorinated vinyl monomer such as 2,2,2-trifluroethyl methacrylate) capable of undergoing radical polymerization (e.g., styrenic, vinylic, acrylic, etc.) using a brominated lactide initiator via atom transfer radical polymerization (ATRP). The brominated lactide initiator may be 3-bromo-3,6-dimethyl-1,4-dioxane-2,5-dione prepared by, for example, reacting lactide with N-bromosuccinimide in the presence of benzoyl peroxide.

BRIEF DESCRIPTION OF THE SEVERAL VIEWS OF THE DRAWINGS

Embodiments of the present invention will hereinafter be described in conjunction with the appended drawings, where like designations denote like elements.

DETAILED DESCRIPTION

The depletion of fossil fuels from which the majority of polymers are derived, combined with supply chain instability and cost fluctuations of feed chemicals used to make these polymers, is driving the development and utilization of biobased plastics for commodity applications. Polylactic acid (PLA), derived from starch and sugars, is a particularly appealing biobased plastic that is inexpensive and already being produced in large commercial quantities. In comparing polymers' material properties, polystyrene is often considered the petrochemical-based counterpart to PLA. Thus PLA is capable of replacing many petroleum-derived polymers in some applications. However, several of PLA's material properties—such as low heat-distortion temperature, high water adsorption, low flame retardancy, and low toughness—exclude the use of PLA in many applications. Moreover, additives to improve such properties are often expensive and/or come at the cost of sacrificing PLA's beneficial material properties.

One of the most sought after property improvements for PLA is a decrease in its moisture vapor transmission rate, owing to the fact that PLA is inherently hygroscopic. Packaging of water-containing products is a highly desired application for PLA, but its high moisture vapor transmission rate leads to rapid leaching of water through PLA films, and therefore PLA is currently only utilized for short shelf-life packaging applications.

PLA's monomer is lactide. For purposes of this document, including the claims, the term "lactide" includes all stereoisomers of lactide (e.g., (S,S)-lactide, (R,R)-lactide, and (S,R)-lactide). (S,S)-lactide is also referred to as "L-lactide". (R,R)-lactide is also referred to as "D-lactide". (S,R)-lactide is also referred to as "meso-lactide". A racemic mixture of D-lactide and L-lactide is often referred to as "DL-lactide".

In accordance with some embodiments of the present invention, lactide-functionalized hydrophobic macromonomers are used to form hydrophobic bottlebrush and graft copolymers with PLA backbones. Lactide-functionalized hydrophobic macromonomers utilized in this regard may be lactide-functionalized hydrophobic polymers with a lactide endgroup and a polymer backbone chosen to tailor material properties of the overall copolymer. That is, lactide (PLA's monomer) can be functionalized with a wide array of different hydrophobic polymers (also referred to herein as "HY-polymers") designed to engineer hydrophobic properties (and, optionally, additional properties) to bottlebrush and graft copolymers. This extends the use of PLA to applications not previously possible and creates new markets for PLA.

In accordance with some embodiments of the present invention, PLA is chemically modified to possess hydrophobic polymers such as poly(2,2,2-trifluoroethyl methacrylate) known for low moisture vapor transmission rates. These hydrophobic polymers are bonded to the PLA backbone. Initiated from brominated lactide, these hydrophobic polymers are formed, in accordance with some embodiments of the present invention, by atom transfer radical polymerization (ATRP) of corresponding monomers, thereby forming a lactide-functionalized hydrophobic macromonomer with a reactive lactide endgroup. This macromonomer may then be utilized in a ring-opening polymerization (ROP), in accordance with some embodiments of the present invention, to form a PLA polymer that is chemically bonded to a hydrophobe. These synthetic techniques are scalable. The hydrophobic graft/bottlebrush copolymer architecture with a PLA core polymer and hydrophobic polymers at the periphery acts as a "masking" mechanism, shielding the PLA core polymer from water absorption. The hydrophobic PLA is shielded from moisture on the molecular level and possesses low moisture vapor transmission rates.

Lactide-functionalized hydrophobic macromonomers can be polymerized either alone to form PLA-backbone bottlebrush copolymers with low moisture vapor transmission rates (see FIG. 1, described below) or in the presence of non-functionalized lactide to form PLA-backbone graft copolymers with low moisture vapor transmission rates (see FIG. 2, described below). PLA-backbone bottlebrush copolymers with low moisture vapor transmission rates synthesized in accordance with some embodiments of the present invention have a relatively high density of grafted HY-polymers, while PLA-backbone graft copolymers with low moisture vapor transmission rates synthesized in accordance with some embodiments of the present invention have a relatively low density of grafted HY-polymers. PLA-backbone bottlebrush copolymers with low moisture vapor transmission rates and PLA-backbone graft copolymers with low moisture vapor transmission rates synthesized in accordance with some embodiments of the present invention are well defined and controllable with low polydispersities (e.g., PDI<1.5).

PLA-backbone bottlebrush copolymers with low moisture vapor transmission rates and PLA-backbone graft copolymers with low moisture vapor transmission rates synthesized in accordance with some embodiments of the present invention constitute chemically-functionalized PLA, and the HY-polymers (e.g., styrenic, vinylic, acrylic, etc.) bonded to the PLA can be strategically chosen to engineer hydrophobic properties (and, optionally, various additional desired properties) in to the overall copolymer. Furthermore, covalent bonding of HY-polymers to PLA, as in the PLA-backbone bottlebrush and graft copolymers with low moisture vapor transmission rates synthesized in accordance with some embodiments of the present invention, has the additional advantage of forming micro- and nano-structured polymers, resulting from phase separation of the two chemically bonded polymeric components. Micro- and nano-scale phase separation of immiscible polymers results in maximized load transfer between the two phases, thereby optimizing the positive effect of the hydrophobic macromonomer on the overall copolymer.

Micro- and nano-structured polymers are formed, in accordance with some embodiments of the present invention, by a simple annealing process (i.e., heating) of the PLA-backbone bottlebrush and graft copolymers with low moisture vapor transmission rates. This simple annealing process results in phase separation of the two polymeric components of the PLA-backbone bottlebrush and graft copolymers with low moisture vapor transmission rates.

Figure 1:
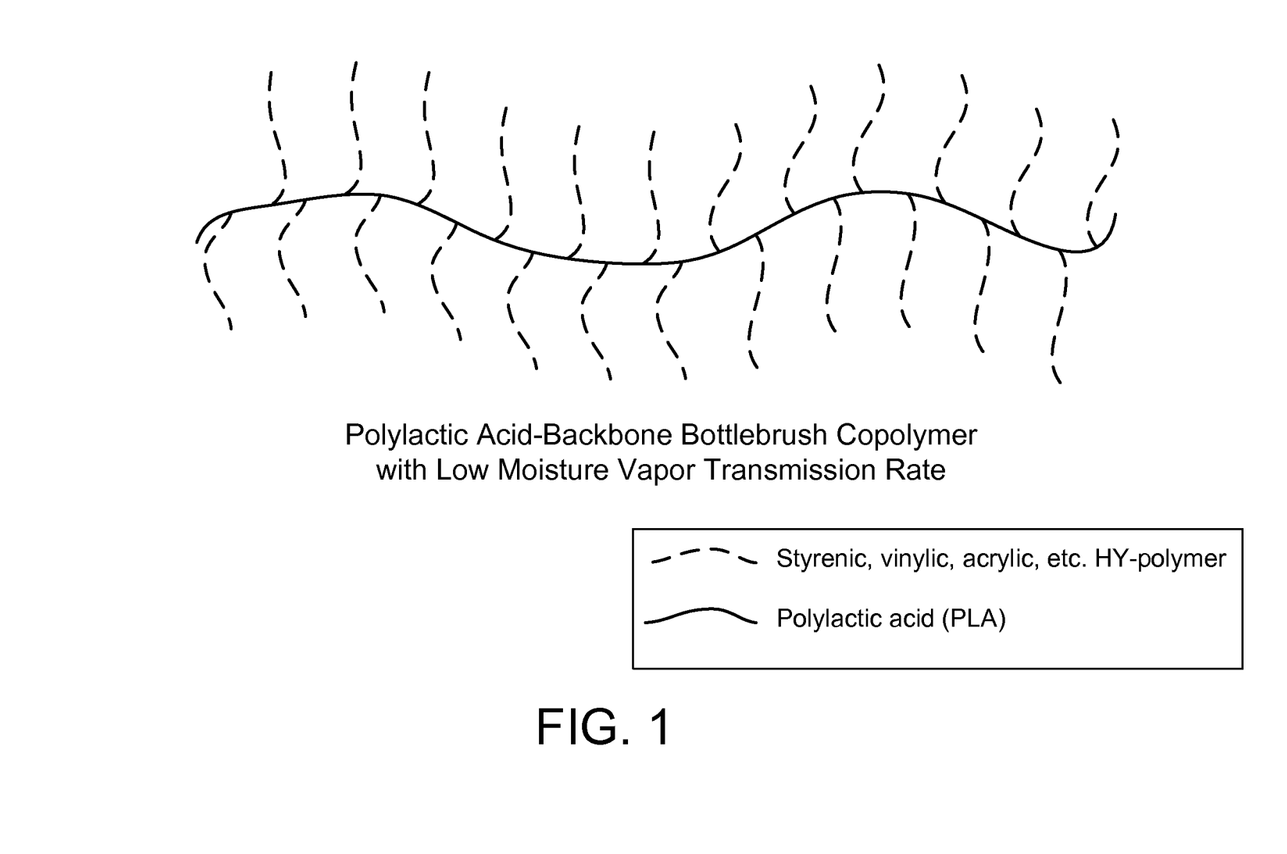
FIG. 1 is a graphical depiction of a low moisture vapor transmission rate bottlebrush copolymer having a polylactic acid-backbone and hydrophobic polymer (e.g., styrenic, vinylic, acrylic, etc. HY-polymer) grafts.

FIG. 1 is a graphical depiction of a hydrophobic bottlebrush copolymer having a polylactic acid-backbone and HY-polymer (e.g., styrenic, vinylic, acrylic, etc.) grafts. In FIG. 1, the PLA-backbone is depicted with a solid line and the grafted HY-polymers are depicted with dashed lines. As noted above, PLA-backbone bottlebrush copolymers with low moisture vapor transmission rates synthesized in accordance with some embodiments of the present invention have a relatively high density of grafted HY-polymers.

Figure 2:
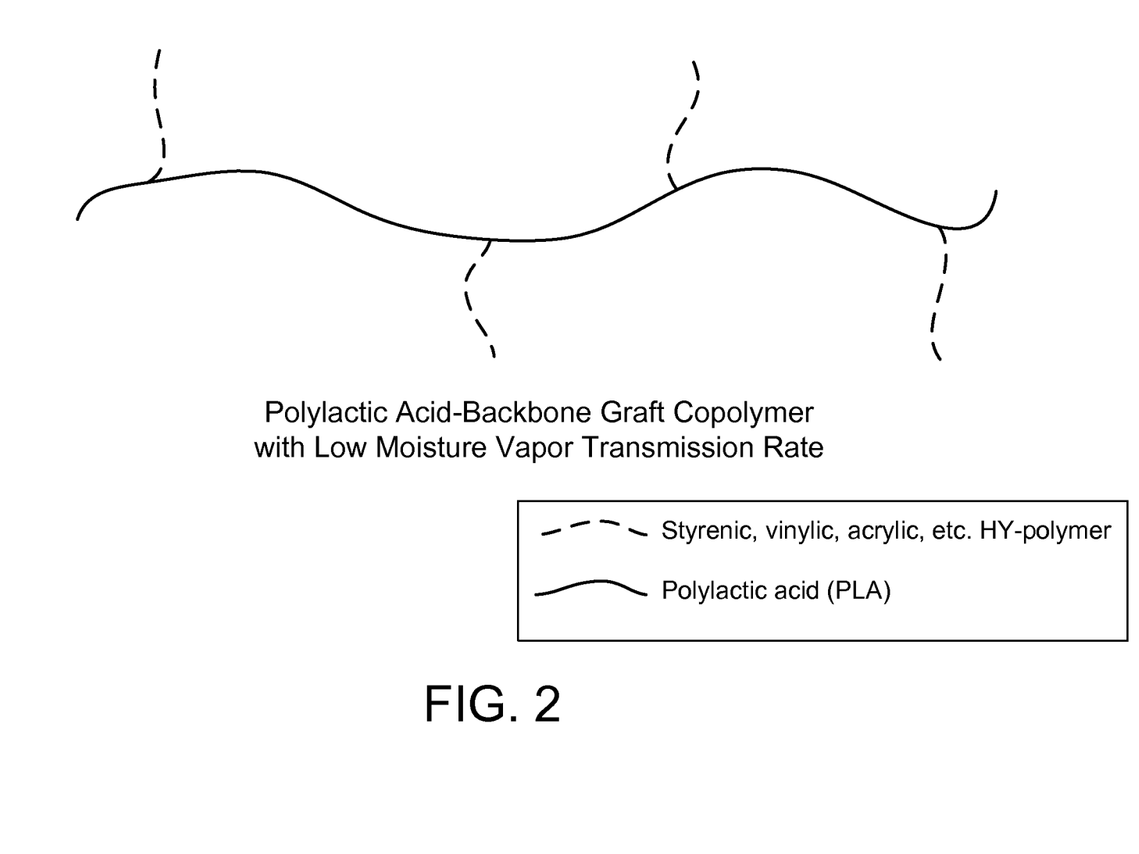
FIG. 2 is graphical depiction of a low moisture vapor transmission rate hydrophobic graft copolymer having a polylactic acid-backbone and hydrophobic polymer (e.g., styrenic, vinylic, acrylic, etc. HY-polymer) grafts.

FIG. 2 is graphical depiction of a hydrophobic graft copolymer having a polylactic acid-backbone and HY-polymer (e.g., styrenic, vinylic, acrylic, etc.) grafts. In FIG. 2, the PLA-backbone is depicted with a solid line and the grafted HY-polymers are depicted with dashed lines. As noted above, PLA-backbone graft copolymers with low moisture vapor transmission rates synthesized in accordance with some embodiments of the present invention have a relatively low density of grafted HY-polymers.

The polydispersity index (PDI) is a measure of the distribution of molecular mass in a given polymer sample. PDI is defined as $M_w/M_n$, where $M_w$ is the weight-average molecular weight and $M_n$ is the number-average molecular weight. PLA-backbone bottlebrush copolymers with low moisture vapor transmission rates and PLA-backbone graft copolymers with low moisture vapor transmission rates synthesized in accordance with some embodiments of the present invention have low PDI (e.g., PDI<1.5).

A simple, two-step method may be employed to chemically modify lactide (PLA's monomer) in such a way that it can be functionalized with a wide array of different HY-polymers designed to engineer hydrophobic properties (and, optionally, various additional desired properties) to PLA. Brominated lactide (which may be formed in a one-step process from lactide monomer) can be used directly to initiate polymerization of a variety of hydrophobic monomers through a well-known, often-utilized process called atom-transfer radical polymerization (ATRP). This results in a lactide-functionalized hydrophobic polymer, i.e., a lactide molecule that is functionalized with a hydrophobic polymer. By using lactide as an ATRP-based initiator, it is possible to form well-defined, "living", and low polydispersity index (PDI) polymers. Hence, only two well-defined, high-yielding chemical reactions are required to synthesize a lactide-functionalized hydrophobic polymer.

ATRP is a polymerization technique that is well known to those skilled in the art. ATRP is a controlled "living" free radical polymerization technique. A low concentration of active radicals is maintained to promote slow growth of the molecular weight and, hence, the "living" ATRP process is controlled. Lactide-functionalized hydrophobic polymers synthesized via ATRP are "living" polymers in the same sense. These polymers present no inherent termination mechanism.

In accordance with some embodiments of the present invention, lactide-functionalized hydrophobic polymers are used as macromonomers. Generally, macromonomers are oligomers with a number-average molecular weight $M_n$ between about 1000 and about 10,000 that contain at least one functional group suitable for further polymerization.

A lactide-functionalized hydrophobic polymer may be synthesized by ATRP of a hydrophobic monomer capable of undergoing radical polymerization (e.g., styrenic, vinylic, acrylic, etc.) using 3-bromo-3,6-dimethyl-1,4-dioxane-2,5-dione as a brominated lactide initiator. 3-bromo-3,6-dimethyl-1,4-dioxane-2,5-dione may be prepared by, for example, reacting lactide with N-bromosuccinimide (NBS) in the presence of benzoyl peroxide. One skilled in the art will appreciate, however, that 3-bromo-3,6-dimethyl-1,4-dioxane-2,5-dione may be prepared using any number of methods known to those skilled in the art. For example, 3-bromo-3,6-dimethyl-1,4-dioxane-2,5-dione may be prepared by reacting lactide with bromine ($Br_2$) in the presence of benzoyl peroxide.

Lactide is a commercially available biobased cyclic ester monomer that can be obtained from biomass. Lactide is the cyclic di-ester of lactic acid. Lactide may be prepared by heating lactic acid in the presence of an acid catalyst. Lactide is a solid at room temperature. The melting point temperature of each of L-lactide and D-lactide is between 95 and 97° C. Racemic lactide has a melting point temperature between 116 and 119° C. The melting point temperature of meso-lactide is less than 60° C. (−53° C.).

The brominated lactide initiator, in the presence of a copper (I) and, optionally, copper (II) complex, an appropriate ligand (e.g., N,N,N',N',N"-pentamethyldiethylenetriamine (PMDETA)) and a hydrophobic monomer capable of undergoing radical polymerization (e.g., styrenic, vinylic, acrylic, etc.) undergoes an ATRP reaction to form a lactide-functionalized hydrophobic polymer with a polymer backbone (the identity of polymer may be chosen to tailor hydrophobic properties and, optionally, various additional desired properties) and a lactide endgroup capable of, for example, being polymerized through traditional PLA synthetic methods or using as a standalone initiator. As an illustrative example, polymerization of hydrophobic monomer 2,2,2-trifluoroethyl methacrylate via ATRP may be performed in tetrahydrofuran (THF) at 60-70° C. In this example, the concentration of 2,2,2-trifluoroethyl methacrylate may be approximately 1.6 M and the ratio of 2,2,2-trifluoroethyl methacrylate to 3-bromo-3,6-dimethyl-1,4-dioxane-2,5-dione may be approximately 200. Alternatively, the ATRP reaction may be performed in a melt state (e.g., no solvent) using melt polymerization. Melt polymerization techniques are well known in the art.

As noted above, ATRP is a polymerization technique that is well known to those skilled in the art. ATRP can be used with myriad different hydrophobic monomers to produce myriad different HY-polymers without undue experimentation. Generally, polymerization via ATRP is conducted under extremely low steady state concentration of active radicals, allowing propagation of the polymer chain to proceed with suppressed radical-radical coupling. For example, the monomer and initiator may be added to a solution containing a catalytic copper/ligand complex (i.e., an ATRP catalyst and a ligand). Exemplary ATRP catalysts include, but are not limited to, copper(I) complexes such as copper(I) bromide (CuBr) and, optionally, copper(II) complexes such as copper(II) dibromide ($CuBr_2$). Traditional ATRP can be done with added copper (II), but still must have some copper (I) added. Exemplary ligands include, but are not limited to, bi-, tri- and tetradentate amines such as N,N,N',N',N"-pentamethyldiethylenetriamine (PMDETA) and bipyridines such as 4,4'-dinonyl-2,2'-bipyridine (DNBP).

The catalytic copper/ligand complex may be deoxygenated using known techniques such as successive cycles of freeze-pump-thaw. One skilled in the art will appreciate, however, that other techniques for deoxygenating the mixture may be used in lieu of, or in addition to, successive cycles of freeze-pump-thaw.

The ratio of ATRP catalyst (e.g., CuBr) to hydrophobic monomer (e.g., 2,2,2-trifluoroethyl methacrylate) can vary, although suitable results are obtained with ratios of 10:1-50:1. The ratio of hydrophobic monomer (e.g., 2,2,2-trifluoroethyl methacrylate) to initiator (e.g., 3-bromo-3,6-dimethyl-1,4-dioxane-2,5-dione) may also vary, although ratios of about 1:10-1:200 (or more) provide suitable results.

The ATRP synthesis of the lactide-functionalized hydrophobic polymer is performed at an appropriate temperature, for example, 60-70° C. The appropriate temperature can vary, however, depending on a number of factors including, but not limited to, the identity of the hydrophobic monomer, the initiator, the ATRP catalyst, and the ligand, as well as the boiling point of the solvent, if any.

The order of addition of the reagents can have a profound affect on the initiator efficiency. To optimize this, the copper/ligand complex must be formed with a slight excess of copper prior to exposure to the brominated lactide initiator.

PLA-backbone bottlebrush copolymers with low moisture vapor transmission rates and PLA-backbone graft copolymers with low moisture vapor transmission rates are synthesized, in accordance with some embodiments of the present invention, by using the lactide-functionalized hydrophobic polymer as a macromonomer in a well-known, often-utilized process called ring-opening polymerization (ROP). Lactide-functionalized hydrophobic macromonomer is polymerized either alone (Reaction Scheme 1, described below) to form PLA-backbone bottlebrush copolymers with low moisture vapor transmission rates or in the presence of lactide (Reaction Scheme 2, described below) to form PLA-backbone graft copolymers with low moisture vapor transmission rates. Various catalysts well known in PLA polymerization can be utilized in the polymerization of the lactide-functionalized hydrophobic macromonomer. Exemplary catalysts include, but are not limited to, tin(II) 2-ethylhexanoate ($Sn(Oct)_2$) (also referred to as "stannous octoate" and "tin octoate"), dimethylaminopyridine (DMAP), diazabicycloundecene (DBU), and the like.

As noted above, ROP is a polymerization technique that is well known to those skilled in the art. Generally, both metal and metal-free catalysts may be used in ROP polymerizations. The catalyst facilitates a coordination-insertion with the carbonyl portion of the lactide-functionalized hydrophobic macromonomer (and, optionally, lactide if synthesizing a PLA-backbone graft copolymer with a low moisture vapor transmission rate) and the hydroxyl group of an available alcohol. The ring-opening of the lactide-functionalized hydrophobic macromonomer (and, optionally, lactide if synthesizing a PLA-backbone graft copolymer with a low moisture vapor transmission rate) by the available alcohol results in the availability of another alcohol for further polymerization.

Reaction Scheme 1, described below, is a general synthetic example of the polymerization to synthesize PLA-backbone bottlebrush copolymers with low moisture vapor transmission rates in accordance with some embodiments of the present invention. In the first step of Reaction Scheme 1, brominated lactide monomer 3-bromo-3,6-dimethyl-1,4-dioxane-2,5-dione is prepared by reacting lactide with N-bromosuccinimide (NBS) in the presence of benzoyl peroxide. In the second step of Reaction Scheme 1, a lactide-functionalized hydrophobic polymer is obtained by ATRP of a hydrophobic monomer capable of undergoing radical polymerization (e.g., styrenic, vinylic, acrylic, etc.) initiated from the brominated lactide monomer in the presence of a copper (I) complex/PMDETA. In the third step of Reaction Scheme 1, a PLA-backbone bottlebrush copolymer with a low moisture vapor transmission rate is obtained by ROP using the lactide-functionalized hydrophobic polymer as a macromonomer.

Reaction Scheme 1

In the second and third steps of Reaction Scheme 1, R is a hydrogen atom or a methyl group, and wherein HY is a phenyl group functionalized with a fluorine-containing moiety or C(O)OR', wherein R' is an alkyl group having one or more carbon atoms functionalized with a fluorine-containing moiety or wherein R' is a linear or branched alkyl group or cycloalkyl group having one or more carbon atoms. Suitable examples of hydrophobic monomers capable of undergoing radical polymerization in the second step of Reaction Scheme 1 include, but are not limited to, 2,2,2-trifluoroethyl methacrylate, 2,2,2-trifluoroethyl acrylate, 1,1,1,3,3,3-hexafluoroisopropyl methacrylate, 1,1,1,3,3,3-hexafluoroisopropyl acrylate, 2,3,4,5,6-pentafluoro styrene, 4-fluorostyrene, 4-(trifluoromethyl)styrene, methyl methacrylate, methyl acrylate, ethyl methacrylate, ethyl acrylate, propyl methacrylate, propyl acrylate, isopropyl methacrylate, isopropyl acrylate, n-butyl methacrylate, n-butyl acrylate, iso-butyl methacrylate, iso-butyl acrylate, tert-butyl methacrylate, tert-butyl acrylate, 2-ethylhexyl methacrylate, 2-ethylhexyl acrylate, lauryl methacrylate, lauryl acrylate, isobornyl methacrylate, isobornyl acrylate, cyclohexyl methacrylate, cyclohexyl acrylate, 3,3,5-trimethylcyclohexyl methacrylate, 3,3,5-trimethylcyclohexyl acrylate, and combinations thereof.

Lactide-functionalized hydrophobic polymers (used as macromonomers in the third step of Reaction Scheme 1) may be synthesized using L-lactide as the starting material. In the first step of Reaction Scheme 1, a bromine addition on the L-lactide is employed to synthesize brominated lactide monomer 3-bromo-3,6-dimethyl-1,4-dioxane-2,5-dione. In the second step of Reaction Scheme 1, a hydrophobic monomer capable of undergoing radical polymerization is polymerized via ATRP using the brominated lactide monomer as an initiator.

In the first step of Reaction Scheme 1, a mixture of L-lactide, benzene and N-bromosuccimide (NBS) are added to a three-neck flask and heated to reflux. Generally, stoichiometric amounts of L-lactide and NBS are used. Mechanical stirring is employed throughout reflux. A solution of benzoyl peroxide in benzene is then added dropwise over time through a dropping funnel, syringe or other suitable technique. Generally, any catalytic amount of benzoyl peroxide may be used. One skilled in the art will appreciate that any suitable solvent may be used in these solutions in lieu, or in addition to, benzene. Suitable solvents include, but are not limited to, benzene and acetonitrile. After the monomer is consumed, the reaction mixture is cooled to room temperature. The reaction product, which is brominated lactide monomer 3-bromo-3,6-dimethyl-1,4-dioxane-2,5-dione, may be purified using techniques well known in the art.

In the second step of Reaction Scheme 1, CuBr and N,N,N',N',N''-pentamethyldiethylenetriamine (PMDETA) are added to a first flask, along with a magnetic stirrer. The first flask is fitted with a rubber septum and degassed with three successive cycles of freeze-pump-thaw. Generally, the catalytic complex must be formed with a slight excess of copper ($[Cu]_0[PMDETA]_0>1$) before exposure to the lactide initiator. Providing a slight excess of copper prevents undesirable side reactions. To a second flask are added some of the 3-bromo-3,6-dimethyl-1,4-dioxane-2,5-dione prepared in the first step of Reaction Scheme 1, THF, and a hydrophobic monomer capable of undergoing radical polymerization. Generally, the ratio of [hydrophobic monomer]$_0$/[3-bromo-3,6-dimethyl-1,4-dioxane-2,5-dione]$_0$ that may be used ranges from 1:10-1:200 (or more). The second flask is fitted with a rubber septum and degassed by bubbling with $N_2$ flow for at least 30 minutes. This mixture is then transferred into the first flask and the polymerization is carried out under stirring at a suitable temperature. Polymerization typically occurs over a period of hours. Generally, the polymerization of the hydrophobic monomer via ATRP may be performed in THF at 60-70° C. The reaction product, which is lactide-functionalized hydrophobic polymer 3-poly(hydrophobic monomer)-3,6-dimethyl-1,4-dioxane-2,5-dione, may be purified using techniques well known in the art.

One skilled in the art will appreciate that any suitable catalytic complex may be used in lieu, or in addition to, CuBr/PMDETA catalytic complex. Suitable catalytic complexes include both a suitable ATRP catalyst and a suitable ligand. Suitable ATRP catalysts include, but are not limited to, copper(I) complexes such as CuBr or other copper halides. Suitable ligands include, but are not limited to, bi-, tri- and tetradentate amines and bipyridines. Specific examples of suitable ligands include N,N,N',N',N''-pentamethyldiethylenetriamine (PMDETA), 4,4'-dinonyl-2,2'-bipyridine (DNBP), and 1,1,4,7,10,10-hexamethyltriethylenetetramine (HMTETA).

In the third step of Reaction Scheme 1, a solution of stannous octoate ($Sn(Oct)_2$) in anhydrous toluene and a solution of benzyl alcohol in anhydrous toluene are added to a flask, and the solvent is removed in vacuo. Generally, any catalytic amount of $Sn(Oct)_2$ or other suitable catalyst may be used. A similar amount of benzyl alcohol or other suitable initiator is typically used. One skilled in the art will appreciate that any suitable solvent may be used in the Sn(Oct)2 solution and benzyl alcohol solution in lieu, or in addition to, anhydrous toluene. Some of the lactide-functionalized hydrophobic polymer (macromonomer) prepared in the second step of Reaction Scheme 1 is added to the flask, along with a magnetic stirrer. The flask is fitted with a rubber septum and degassed by bubbling with $N_2$ flow for at least 30 minutes. The polymerization is carried out under stirring at a suitable temperature. Polymerization typically occurs over a period of hours. Generally, the polymerization of the lactide-functionalized hydrophobic macromonomer via ROP may be performed in toluene at 110° C. Alternatively, the ROP reaction may be performed in a melt state (e.g., no solvent) at 110-180° C. using melt polymerization. Melt polymerization techniques are well known in the art. The reaction product, which is a PLA-backbone bottlebrush copolymer with a low moisture vapor transmission rate, may be purified using techniques well known in the art.

One skilled in the art will appreciate that any suitable catalyst may be used in lieu, or in addition to, Sn(Oct)$_2$. Generally, both metal and metal-free catalysts may be used. Suitable catalysts include, but are not limited to, Sn(Oct)$_2$, dimethylaminopyridine (DMAP), 1,8-diazabicycloundec-7-ene (DBU), and 1,5,7-triazabicyclo[4.4.0]dec-5-ene (TBD).

One skilled in the art will appreciate that any initiator may be used in lieu, or in addition to, benzyl alcohol. Suitable initiators include, but are not limited to, benzyl alcohol, primary alcohols (e.g., ethanol and butanol), 2-hydroxyethyl acrylate, and 2-hydroxyethyl methacrylate.

Reaction Scheme 2, described below, is a general synthetic example of the polymerization to synthesize PLA-backbone graft copolymers with low moisture vapor transmission rates in accordance with some embodiments of the present invention. In the first step of Reaction Scheme 2, brominated lactide monomer 3-bromo-3,6-dimethyl-1,4-dioxane-2,5-dione is prepared by reacting lactide with N-bromosuccinimide (NBS) in the presence of benzoyl peroxide. In the second step of Reaction Scheme 2, a lactide-functionalized hydrophobic polymer is obtained by ATRP of a hydrophobic monomer capable of undergoing radical polymerization (e.g., styrenic, vinylic, acrylic, etc.) initiated from the brominated lactide monomer in the presence of a copper (I) complex/PMDETA. In the third step of Reaction Scheme 2, a PLA-backbone graft copolymer with a low moisture vapor transmission rate is obtained by ROP using and the lactide-functionalized hydrophobic polymer as a macromonomer and non-functionalized lactide.

Reaction Scheme 2

In the second and third steps of Reaction Scheme 2, R is a hydrogen atom or a methyl group, and wherein HY is a phenyl group functionalized with a fluorine-containing moiety or C(O)OR', wherein R' is an alkyl group having one or more carbon atoms functionalized with a fluorine-containing moiety or wherein R' is a linear or branched alkyl group or cycloalkyl group having one or more carbon atoms. Suitable examples of hydrophobic monomers capable of undergoing radical polymerization in the second step of Reaction Scheme 2 include, but are not limited to, 2,2,2-trifluoroethyl methacrylate, 2,2,2-trifluroethyl acrylate, 1,1,1,3,3,3-hexafluoroisopropyl methacrylate, 1,1,1,3,3,3-hexafluoroisopropyl acrylate, 2,3,4,5,6-pentaflurostyrene, 4-fluorostyrene, 4-(trifluoromethyl)styrene, methyl methacrylate, methyl acrylate, ethyl methacrylate, ethyl acrylate, propyl methacrylate, propyl acrylate, isopropyl methacrylate, isopropyl acrylate, n-butyl methacrylate, n-butyl acrylate, iso-butyl methacryate, iso-butyl acrylate, tert-butyl methacrylate, tert-butyl acrylate, 2-ethylhexyl methacrylate, 2-ethylhexyl acrylate, lauryl methacrylate, lauryl acrylate, isobornyl methacrylate, isobornyl acrylate, cyclohexyl methacrylate, cyclohexyl acrylate, 3,3,5-trimethylcyclohexyl methacrylate, 3,3,5-trimethylcyclohexyl acrylate, and combinations thereof.

Lactide-functionalized hydrophobic polymers (used as macromonomers in the third step of Reaction Scheme 2) may be synthesized using L-lactide as the starting material. In the first step of Reaction Scheme 2, a bromine addition on the L-lactide is employed to synthesize brominated lactide monomer 3-bromo-3,6-dimethyl-1,4-dioxane-2,5-dione. In the second step of Reaction Scheme 2, a hydrophobic monomer capable of undergoing radical polymerization is polymerized via ATRP using the brominated lactide monomer as an initiator.

In the first step of Reaction Scheme 2, a mixture of L-lactide, benzene and N-bromosuccimide (NBS) are added to a three-neck flask and heated to reflux. Generally, stoichiometric amounts of L-lactide and NBS are used. Mechanical stirring is employed throughout reflux. A solution of benzoyl peroxide in benzene is then added dropwise over time through a dropping funnel, syringe or other suitable technique. Generally, any catalytic amount of benzoyl peroxide may be used. One skilled in the art will appreciate that any suitable solvent may be used in these solutions in lieu, or in addition to, benzene. Suitable solvents include, but are not limited to, benzene and acetonitrile. After the monomer is consumed, the reaction mixture is cooled to room temperature. The reaction product, which is brominated lactide monomer 3-bromo-3,6-dimethyl-1,4-dioxane-2,5-dione, may be purified using techniques well known in the art.

In the second step of Reaction Scheme 2, CuBr and N,N,N',N',N"-pentamethyldiethylenetriamine (PMDETA) are added to a first flask, along with a magnetic stirrer. The first flask is fitted with a rubber septum and degassed with three successive cycles of freeze-pump-thaw. Generally, the catalytic complex must be formed with a slight excess of copper ([Cu]$_0$[PMDETA]$_0$>1) before exposure to the lactide initiator. Providing a slight excess of copper prevents undesirable side reactions. To a second flask are added some of the 3-bromo-3,6-dimethyl-1,4-dioxane-2,5-dione prepared in the first step of Reaction Scheme 2, THF, and a hydrophobic monomer capable of undergoing radical polymerization. Generally, the ratio of [hydrophobic monomer]$_0$/[3-bromo-3,6-dimethyl-1,4-dioxane-2,5-dione]$_0$ that may be used ranges from 1:10-1:200 (or more). The second flask is fitted with a rubber septum and degassed by bubbling with N$_2$ flow for a few minutes. This mixture is then transferred into the first flask and the polymerization is carried out under stirring at a suitable temperature. Polymerization typically occurs over a period of hours. Generally, the polymerization of the hydrophobic monomer via ATRP may be performed in THF at 60-70° C. The reaction product, which is lactide-functionalized hydrophobic polymer 3-poly(hydrophobic monomer)-3,6-dimethyl-1,4-dioxane-2,5-dione, may be purified using techniques well known in the art.

One skilled in the art will appreciate that any suitable catalytic complex may be used in lieu, or in addition to, CuBr/PMDETA catalytic complex. Suitable catalytic complexes include both a suitable ATRP catalyst and a suitable ligand. Suitable ATRP catalysts include, but are not limited to, copper(I) complexes such as CuBr or other copper halides. Suitable ligands include, but are not limited to, bi-, tri- and tetradentate amines and bipyridines. Specific examples of suitable ligands include N,N,N',N',N''-pentamethyldiethylenetriamine (PMDETA), 4,4'-dinonyl-2,2'-bipyridine (DNBP), and 1,1,4,7,10,10-hexamethyltriethylenetetramine (HMTETA).

In the third step of Reaction Scheme 2, a solution of stannous octoate ($Sn(Oct)_2$) in anhydrous toluene and a solution of benzyl alcohol in anhydrous toluene are added to a flask, and the solvent is removed in vacuo. Generally, any catalytic amount of $Sn(Oct)_2$ or other suitable catalyst may be used. A similar amount of benzyl alcohol or other suitable initiator is typically used. One skilled in the art will appreciate that any suitable solvent may be used in the Sn(Oct)2 solution and benzyl alcohol solution in lieu, or in addition to, anhydrous toluene. Some of the lactide-functionalized hydrophobic polymer (macromonomer) prepared in the second step of Reaction Scheme 2 and non-functionalized lactide are added to the flask, along with a magnetic stirrer. Generally, the amount of lactide-functionalized hydrophobic macromonomer relative to the amount of non-functionalized lactide may be adjusted to achieve a desired density of grafted HY-polymers. The flask is fitted with a rubber septum and degassed by bubbling with $N_2$ flow for at least 30 minutes. The polymerization is carried out under stirring at a suitable temperature. Polymerization typically occurs over a period of hours. Generally, the polymerization of the lactide-functionalized hydrophobic macromonomer and non-functionalized lactide via ROP may be performed in toluene at 110° C. Alternatively, the ROP reaction may be performed in a melt state (e.g., no solvent) at 110-180° C. using melt polymerization. Melt polymerization techniques are well known in the art. The reaction product, which is a PLA-backbone graft copolymer with a low moisture vapor transmission rate, may be purified using techniques well known in the art.

One skilled in the art will appreciate that any suitable catalyst may be used in lieu, or in addition to, $Sn(Oct)_2$. Generally, both metal and metal-free catalysts may be used. Suitable catalysts include, but are not limited to, $Sn(Oct)_2$, dimethylaminopyridine (DMAP), 1,8-diazabicycloundec-7-ene (DBU), and 1,5,7-triazabicyclo[4.4.0]dec-5-ene (TBD).

One skilled in the art will appreciate that any initiator may be used in lieu, or in addition to, benzyl alcohol. Suitable initiators include, but are not limited to, benzyl alcohol, primary alcohols (e.g., ethanol and butanol), 2-hydroxyethyl acrylate, and 2-hydroxyethyl methacrylate.

Prophetic Example 1

Figure 3:
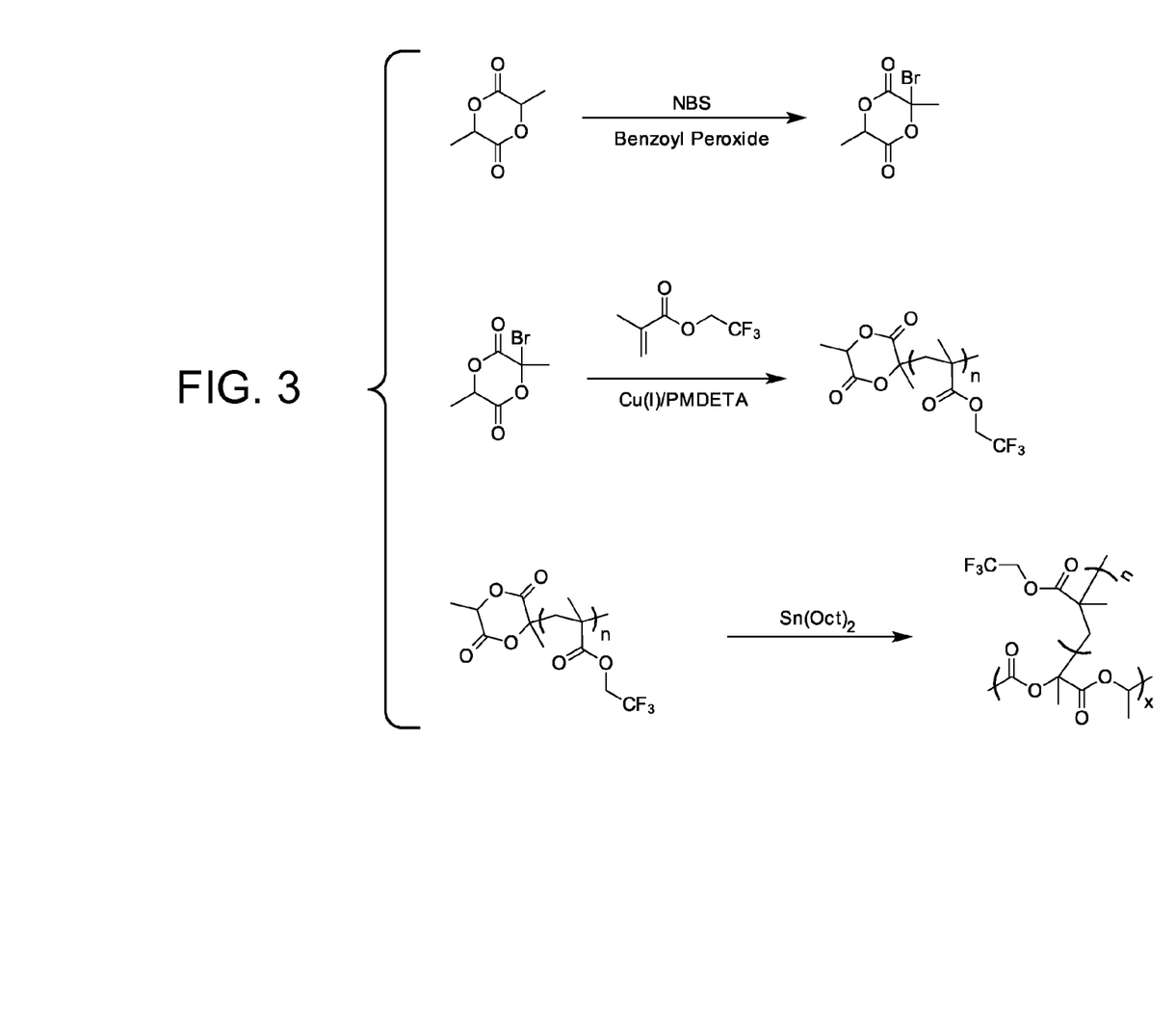
FIG. 3 is a chemical reaction diagram showing the preparation of a low moisture vapor transmission rate polylactic acid-backbone bottlebrush copolymer from the lactide-functionalized hydrophobic polymer 3-poly(2,2,2-trifluoroethyl methacrylate)-3,6-dimethyl-1,4-dioxane-2,5-dione using ring-opening polymerization in accordance with some embodiments of the present invention.

Synthesis of HY-Bottlebrush Copolymer PLA-g-poly(2,2,2-trifluoroethyl methacrylate) Via ROP Using 3-poly(2,2,2-trifluoroethyl methacrylate)-3,6-dimethyl-1,4-dioxane-2,5-dione as a Macromonomer In this prophetic example, PLA-g-poly(2,2,2-trifluoroethyl methacrylate) bottlebrush copolymer is synthesized using lactide-functionalized hydrophobic polymer 3-poly(2,2,2-trifluoroethyl methacrylate)-3,6-dimethyl-1,4-dioxane-2,5-dione as a macromonomer. For this synthesis, as illustrated in FIG. 3, a bromine addition on the L-lactide is employed to synthesize brominated lactide monomer 3-bromo-3,6-dimethyl-1,4-dioxane-2,5-dione, followed by polymerization of 3-poly(2,2,2-trifluoroethyl methacrylate)-3,6-dimethyl-1,4-dioxane-2,5-dione via ATRP using the brominated lactide monomer as an initiator to form the lactide-functionalized hydrophobic macromonomer 3-poly(2,2,2-trifluoroethyl methacrylate)-3,6-dimethyl-1,4-dioxane-2,5-dione, followed by polymerization of the lactide-functionalized hydrophobic macromonomer via ROP to form the HY-bottlebrush copolymer PLA-g-poly(2,2,2-trifluoroethyl methacrylate).

Synthesis of 3-bromo-3,6-dimethyl-1,4-dioxane-2,5-dione. To a 1 L three-neck flask are added L-lactide (100.0 g, 0.694 mol), benzene (500 mL) and N-bromosuccimide (NBS) (136.0 g, 0.764 mmol). The mixture is heated to reflux (approximately 80° C.). Mechanical stirring is employed throughout reflux.

A solution of benzoyl peroxide (3.36 g, 13.9 mmol) in benzene (50 mL) is then added dropwise through a dropping funnel over 20 minutes.

After the monomer is consumed, the reaction mixture is cooled to room temperature. Then, filtration is employed to separate the solid filtride from the liquid filtrate.

The solid filtride from the filtration is evaporated to dryness forming a pale yellow solid. The solid is dissolved in dichloromethane (750 mL) and the solution is washed with saturated sodium bisulfate solution three times and saturated NaCl solution once. The organic layer is dried over $MgSO_4$, and the solution is evaporated to dryness. The orange solid is recrystallized from ethyl acetate and hexanes to produce 68.9 g of white crystals. One skilled in the art will appreciate that recrystallization may be performed in other suitable solutions.

The liquid filtrate from the filtration is evaporated to dryness, and the solid is recrystallized from ethyl acetate and hexanes to produce 27.1 g of white crystals. Here too, one skilled in the art will appreciate that recrystallization may be performed in other suitable solutions.

The combined yield (from both the solid filtride and the liquid filtrate) is 96.1. g (62%).

Synthesis of 3-poly(2,2,2-trifluoroethyl methacrylate)-3,6-dimethyl-1,4-dioxane-2,5-dione. To a first flask are added CuBr (70.5 mg, 0.49 mmol) and N,N,N',N',N''-pentamethyldiethylenetriamine (PMDETA) (78 mg, 0.45 mmol), as well as a magnetic stirrer. The first flask is fitted with a rubber septum and degassed with three successive cycles of freeze-pump-thaw. Generally, the catalytic complex must be formed with a slight excess of copper ($[Cu]_0[PMDETA]_0>1$) before exposure to the lactide initiator. Providing a slight excess of copper prevents undesirable side reactions.

To a second flask are added some of the 3-bromo-3,6-dimethyl-1,4-dioxane-2,5-dione (99.7 mg, 0.45 mmol) prepared in the first step of this example, THF (10 mL), and 2,2,2-trifluoroethyl methacrylate (1.5 g, 9 mmol). Generally, the ratio of $[2,2,2\text{-trifluoroethyl methacrylate}]_0/[3\text{-bromo-3,}6\text{-dimethyl-1,4-dioxane-2,5-dione}]_0$ that may be used ranges from 10 to 200. The second flask is fitted with a rubber septum and degassed by bubbling with $N_2$ flow for at least 30 minutes. This mixture is then transferred into the first flask and the polymerization is carried out under stirring at 70° C. Polymerization occurs over a period of 0.5-4 hours. Generally, the polymerization of 2,2,2-trifluoroethyl methacrylate via ATRP may be performed in THF at 60-70° C. for a [2,2,2-trifluoroethyl methacrylate]$_0$ of 0.5-5 M and [2,2,2-trifluoroethyl methacrylate]$_0$/[3-bromo-3,6-dimethyl-1,4-dioxane-2,5-dione]$_0$ of 10-200.

Copper catalyst is removed by passing the reaction mixture diluted with THF through an alumina gel column.

The 3-poly(2,2,2-trifluoroethyl methacrylate)-3,6-dimethyl-1,4-dioxane-2,5-dione is recovered by precipitation in 7-fold excess of cold methanol, filtrated and dried up to constant weight.

Synthesis of HY-bottlebrush copolymer PLA-g-poly(2,2,2-trifluoroethyl methacrylate). A solution of stannous octoate (Sn(Oct)$_2$) in anhydrous toluene (0.01 mL of 0.05 M solution) and a solution of benzyl alcohol in anhydrous toluene (0.1 mL of 0.04 M solution) are added to a flask, and the solvent is removed in vacuo. Some of the 3-poly(2,2,2-trifluoroethyl methacrylate)-3,6-dimethyl-1,4-dioxane-2,5-dione (macromonomer) (0.72 g, 0.2 mmol) prepared in the second step of this example is added to the flask, along with a magnetic stirrer. The flask is fitted with a rubber septum and degassed by bubbling with N$_2$ flow for at least 30 minutes. The polymerization is carried out under stirring at 110° C. Polymerization occurs over a period of 5 hours. Generally, the polymerization of the lactide-functionalized hydrophobic macromonomer via ROP may be performed in toluene at 110° C. or in the melt at 110-180° C.

The crude PLA-g-poly(2,2,2-trifluoroethyl methacrylate) bottlebrush copolymer is dissolved in chloroform (CHCl$_3$), recovered by precipitation in cold methanol, filtrated, and dried up to constant weight. *End of Prophetic Example 1*

Prophetic Example 2

Figure 4:
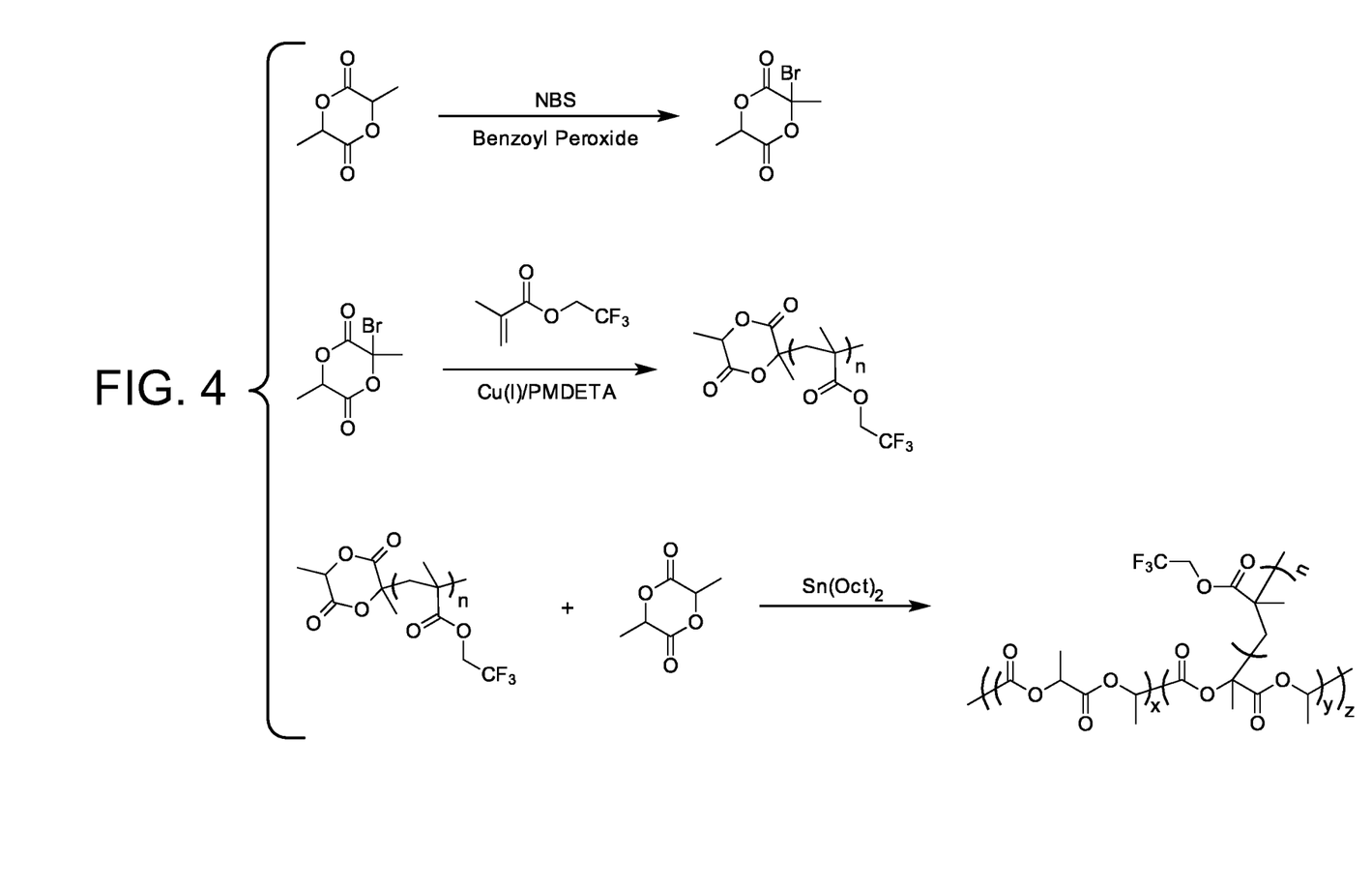
FIG. 4 is a chemical reaction diagram showing the preparation of a low moisture vapor transmission rate polylactic acid-backbone graft copolymer from the lactide-functionalized hydrophobic polymer 3-poly(2,2,2-trifluoroethyl methacrylate)-3,6-dimethyl-1,4-dioxane-2,5-dione and non-functionalized lactide using ring-opening polymerization (ROP) in accordance with some embodiments of the present invention.

Synthesis of HY-Graft Copolymer PLA-g-poly(2,2,2-trifluoroethyl methacrylate) Graft Copolymer Via ROP using 3-poly(2,2,2-trifluoroethyl methacrylate)-3,6-dimethyl-1,4-dioxane-2,5-dione as a Macromonomer Together with Non-Functionalized Lactide In this prophetic example, PLA-g-poly(2,2,2-trifluoroethyl methacrylate) graft copolymer is synthesized using lactide-functionalized hydrophobic polymer 3-poly(2,2,2-trifluoroethyl methacrylate)-3,6-dimethyl-1,4-dioxane-2,5-dione as a macromonomer together with non-functionalized lactide. For this synthesis, as illustrated in FIG. 4, a bromine addition on the L-lactide is employed to synthesize brominated lactide monomer 3-bromo-3,6-dimethyl-1,4-dioxane-2,5-dione, followed by polymerization of 2,2,2-trifluoroethyl methacrylate via ATRP using the brominated lactide monomer as an initiator to form the lactide-functionalized hydrophobic macromonomer, followed by polymerization of the lactide-functionalized hydrophobic macromonomer and non-functionalized lactide via ROP to form the HY-graft copolymer PLA-g-poly(2,2,2-trifluoroethyl methacrylate).

Synthesis of 3-bromo-3,6-dimethyl-1,4-dioxane-2,5-dione. To a 1 L three-neck flask are added L-lactide (100.0 g, 0.694 mol), benzene (500 mL) and N-bromosuccimide (NBS) (136.0 g, 0.764 mmol). The mixture is heated to reflux (approximately 80° C.). Mechanical stirring is employed throughout reflux.

A solution of benzoyl peroxide (3.36 g, 13.9 mmol) in benzene (50 mL) is then added dropwise through a dropping funnel over 20 minutes.

After the monomer is consumed, the reaction mixture is cooled to room temperature. Then, filtration is employed to separate the solid filtride from the liquid filtrate.

The solid filtride from the filtration is evaporated to dryness forming a pale yellow solid. The solid is dissolved in dichloromethane (750 mL) and the solution is washed with saturated sodium bisulfate solution three times and saturated NaCl solution once. The organic layer is dried over MgSO$_4$, and the solution is evaporated to dryness. The orange solid is recrystallized from ethyl acetate and hexanes to produce 68.9 g of white crystals. One skilled in the art will appreciate that recrystallization may be performed in other suitable solutions.

The liquid filtrate from the filtration is evaporated to dryness, and the solid is recrystallized from ethyl acetate and hexanes to produce 27.1 g of white crystals. Here too, one skilled in the art will appreciate that recrystallization may be performed in other suitable solutions.

The combined yield (from both the solid filtride and the liquid filtrate) is 96.1. g (62%).

Synthesis of 3-poly(2,2,2-trifluoroethyl methacrylate)-3,6-dimethyl-1,4-dioxane-2,5-dione. To a first flask are added CuBr (70.5 mg, 0.49 mmol) and N,N,N',N',N''-pentamethyldiethylenetriamine (PMDETA) (78 mg, 0.45 mmol), as well as a magnetic stirrer. The first flask is fitted with a rubber septum and degassed with three successive cycles of freeze-pump-thaw. Generally, the catalytic complex must be formed with a slight excess of copper ([Cu]$_0$[PMDETA]$_0$>1) before exposure to the lactide initiator. Providing a slight excess of copper prevents undesirable side reactions.

To a second flask are added some of the 3-bromo-3,6-dimethyl-1,4-dioxane-2,5-dione (99.7 mg, 0.45 mmol) prepared in the first step of this example, THF (10 mL), and 2,2,2-trifluoroethyl methacrylate (1.5 g, 9 mmol). Generally, the ratio of [2,2,2-trifluoroethyl methacrylate]$_0$/[3-bromo-3,6-dimethyl-1,4-dioxane-2,5-dione]$_0$ that may be used ranges from 10 to 200. The second flask is fitted with a rubber septum and degassed by bubbling with N$_2$ flow for at least 30 minutes. This mixture is then transferred into the first flask and the polymerization is carried out under stirring at 70° C. Polymerization occurs over a period of 0.5-4 hours. Generally, the polymerization of 2,2,2-trifluoroethyl methacrylate via ATRP may be performed in THF at 60-70° C. for a [2,2,2-trifluoroethyl methacrylate]$_0$ of 0.5-5 M and [2,2,2-trifluoroethyl methacrylate]$_0$/[3-bromo-3,6-dimethyl-1,4-dioxane-2,5-dione]$_0$ of 10-200.

Copper catalyst is removed by passing the reaction mixture diluted with THF through an alumina gel column.

The 3-poly(2,2,2-trifluoroethyl methacrylate)-3,6-dimethyl-1,4-dioxane-2,5-dione is recovered by precipitation in 7-fold excess of cold methanol, filtrated and dried up to constant weight.

Synthesis of HY-graft copolymer PLA-g-poly(2,2,2-trifluoroethyl methacrylate). A solution of stannous octoate (Sn(Oct)$_2$) in anhydrous toluene (0.01 mL of 0.05 M solution) and a solution of benzyl alcohol in anhydrous toluene (0.1 mL of 0.04 M solution) are added to a flask, and the solvent is removed in vacuo. Some of the 3-poly(2,2,2-trifluoroethyl methacrylate)-3,6-dimethyl-1,4-dioxane-2,5-dione (macromonomer) (0.72 g, 0.2 mmol) prepared in the second step of this example and non-functionalized lactide (1.0 g, 6.9 mmol) are added to the flask, along with a magnetic stirrer. The flask is fitted with a rubber septum and degassed by bubbling with N$_2$ flow for at least 30 minutes. The polymerization is carried out under stirring at 110° C. Polymerization occurs over a period of 5 hours. Generally, the polymerization of the lactide-functionalized hydrophobic macromonomer and the non-functionalized lactide via ROP may be performed in toluene at 110° C. or in the melt at 110-180° C.

The crude PLA-g-poly(2,2,2-trifluoroethyl methacrylate) graft copolymer is dissolved in chloroform (CHCl$_3$), recovered by precipitation in cold methanol, filtrated, and dried up to constant weight. *End of Prophetic Example 2*

One skilled in the art will appreciate that many variations are possible within the scope of the present invention. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. A method for synthesizing a polylactic acid-backbone bottlebrush or graft copolymer, comprising:
polymerizing a lactide-functionalized hydrophobic macromonomer using ring-opening polymerization (ROP), wherein the lactide-functionalized hydrophobic macromonomer is a lactide-functionalized hydrophobic polymer represented by the following formula:

wherein R is a hydrogen atom or a methyl group, and wherein HY is a phenyl group functionalized with a fluorine-containing moiety or C(O)OR', wherein R' is an alkyl group having one or more carbon atoms functionalized with a fluorine-containing moiety, wherein the variable n denotes a degree of polymerization of a repeating unit, and wherein the value of the variable n is greater than 1.

2. The method as recited in claim 1, wherein the step of polymerizing a lactide-functionalized hydrophobic macromonomer using ring-opening polymerization (ROP) includes polymerizing the lactide-functionalized hydrophobic macromonomer alone to produce a polylactic acid-backbone bottlebrush copolymer having the following formula:

wherein R is a hydrogen atom or a methyl group, and wherein HY is a phenyl group functionalized with a fluorine-containing moiety or C(O)OR', wherein R' is an alkyl group having one or more carbon atoms functionalized with a fluorine-containing moiety, wherein the variables x and n each denotes a degree of polymerization of a respective repeating unit, and wherein the value of the variables x and n each is greater than 1.

3. The method as recited in claim 1, wherein the step of polymerizing a lactide-functionalized hydrophobic macromonomer using ring-opening polymerization (ROP) includes polymerizing the lactide-functionalized hydrophobic macromonomer and lactide to produce a polylactic acid-backbone graft copolymer having the following formula:

wherein R is a hydrogen atom or a methyl group, and wherein HY is a phenyl group functionalized with a fluorine-containing moiety or C(O)OR', wherein R' is an alkyl group having one or more carbon atoms functionalized with a fluorine-containing moiety, wherein the variables x, y, z and n each denotes a degree of polymerization of a respective repeating unit, wherein the value of the variable n is greater than 1, and wherein the value of the variables x, y and z each is equal to or greater than 1.

4. The method as recited in claim 1, wherein the lactide-functionalized hydrophobic macromonomer is 3-poly(2,2,2-trifluoroethyl methacrylate)-3,6-dimethyl-1,4-dioxane-2,5-di one.

5. The method as recited in claim 4, wherein the step of polymerizing a lactide-functionalized hydrophobic macromonomer using ring-opening polymerization (ROP) includes polymerizing the 3-poly(2,2,2-trifluoroethyl methacrylate)-3,6-dimethyl-1,4-dioxane-2,5-dione alone to produce a polylactic acid-backbone bottlebrush copolymer having the following formula:

wherein the variables x and n each denotes a degree of polymerization of a respective repeating unit, and wherein the value of the variables x and n each is greater than 1.

6. The method as recited in claim 4, wherein the step of polymerizing a lactide-functionalized hydrophobic macromonomer using ring-opening polymerization (ROP) includes polymerizing the 3-poly(2,2,2-trifluoroethyl methacrylate)-3,6-dimethyl-1,4-dioxane-2,5-dione and lactide to produce a polylactic acid-backbone graft copolymer having the following formula:

wherein the variables x, y, z and n each denotes a degree of polymerization of a respective repeating unit, wherein the value of the variable n is greater than 1, and wherein the value of the variables x, y and z each is equal to or greater than 1.

7. The method as recited in claim 1, wherein the step of polymerizing a lactide-functionalized hydrophobic macromonomer using ring-opening polymerization (ROP) includes the steps of:
preparing a catalyst/initiator solution comprising a catalyst, an initiator and an organic solvent;
adding the catalyst/initiator solution to a reaction vessel;
removing at least some of the organic solvent from the catalyst/initiator solution in the reaction vessel;
adding the lactide-functionalized hydrophobic macromonomer to the reaction vessel;
heating the reaction vessel.

8. The method as recited in claim 7, wherein the catalyst is $Sn(Oct)_2$.

9. The method as recited in claim 8, wherein the initiator is benzyl alcohol.

10. The method as recited in claim 9, wherein the organic solvent is anhydrous toluene.

11. The method as recited in claim 10, wherein the step of heating the reaction vessel includes the step of heating the reaction vessel to at least 120° C.

12. The method as recited in claim 1, further comprising the step of heating the polylactic acid-backbone bottlebrush or graft copolymer to produce phase separation of polymeric components of the copolymer.

13. The method as recited in claim 2, further comprising the step of heating the polylactic acid-backbone bottlebrush copolymer to produce phase separation of polymeric components of the copolymer.

14. The method as recited in claim 3, further comprising the step of heating the polylactic-acid graft copolymer to produce phase separation of polymeric components of the copolymer.

15. A method for synthesizing a polylactic acid-backbone bottlebrush or graft copolymer, comprising:
polymerizing a lactide-functionalized hydrophobic macromonomer using ring-opening polymerization (ROP), wherein the lactide-functionalized hydrophobic macromonomer is a lactide-functionalized hydrophobic polymer represented by the following formula:

wherein R is a hydrogen atom or a methyl group, and wherein HY is a phenyl group functionalized with a fluorine-containing moiety or C(O)OR', wherein R' is an alkyl group having one or more carbon atoms functionalized with a fluorine-containing moiety, wherein the variable n denotes a degree of polymerization of a repeating unit, and wherein the value of the variable n is sufficient to provide the lactide-functionalized hydrophobic polymer with a number-average molecular weight $M_n$ between about 1000 and about 10,000.

* * * * *